United States Patent
Schaefer

[11] 3,771,400
[45] Nov. 13, 1973

[54] WIRE MEASURING AND CUTTING APPARATUS

[76] Inventor: Otto W. Schaefer, 2838 Alan-A-Dale, Irving, Tex. 75060

[22] Filed: Apr. 3, 1972

[21] Appl. No.: 240,412

[52] U.S. Cl. .................. 83/356, 83/297, 83/580
[51] Int. Cl. ............................................ B21f 11/00
[58] Field of Search ................... 83/356, 580, 296, 83/297, 306

[56] References Cited
UNITED STATES PATENTS

| | | | |
|---|---|---|---|
| 2,506,750 | 5/1950 | Surprenant | 83/296 |
| 2,005,824 | 6/1935 | Haumann | 83/297 |
| 2,234,976 | 3/1941 | Muntwyler | 83/306 |
| 3,151,514 | 10/1964 | Noveske | 83/356 X |

*Primary Examiner*—Frank T. Yost
*Attorney*—Cecil L. Wood et al.

[57] ABSTRACT

For feeding a continuous strand of wire and for cutting the wire into segments of a selected length, the apparatus includes powered feed rollers which feed the wire in a path past a cutter mechanism, and includes a control mechanism for actuating the cutter. The control mechanism is synchronized with the wire feed rollers to effect the actuation of the cutter mechanism after the feed of a preselected length of wire. The control mechanism includes a program chain, or a plurality of interchangeable program chains, with the program chains carrying tripping lugs mounted at selected intervals to set up the apparatus for cutting the wire into segments of selected lengths. The apparatus has means for rendering the automatic program means ineffective and for manually operating the apparatus.

10 Claims, 13 Drawing Figures

PATENTED NOV 13 1973 3,771,400
SHEET 1 OF 4
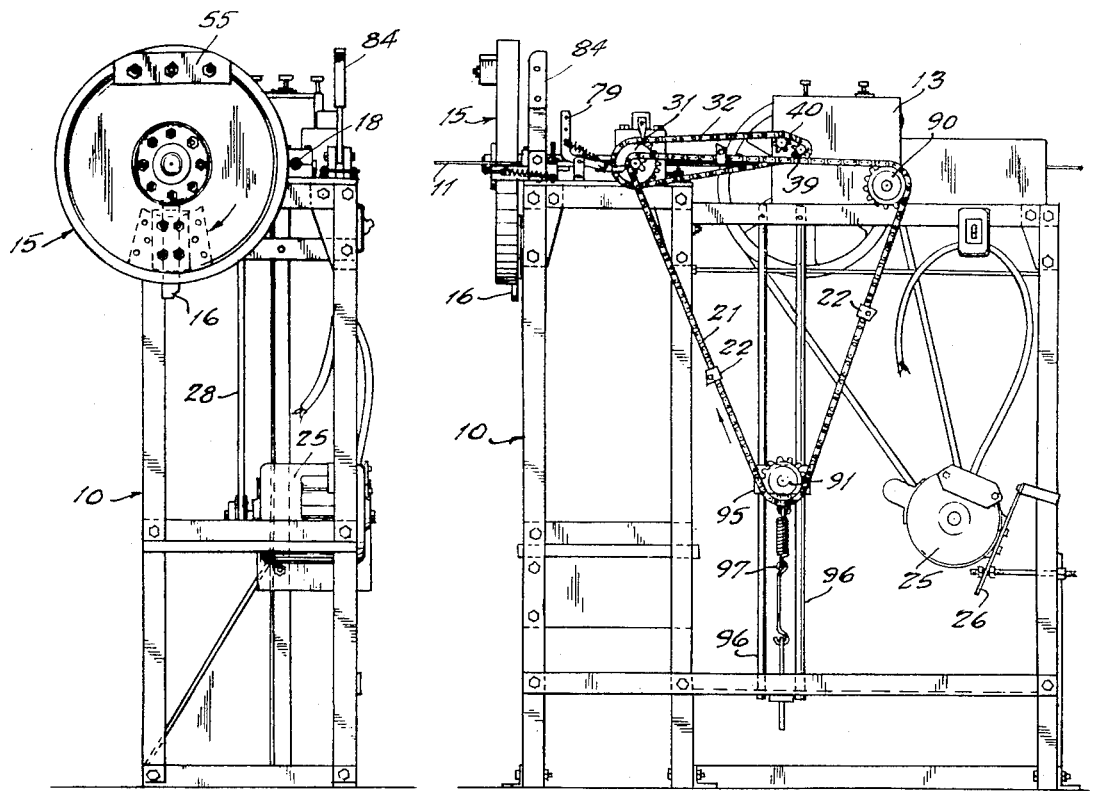
Fig. 1
Fig. 2
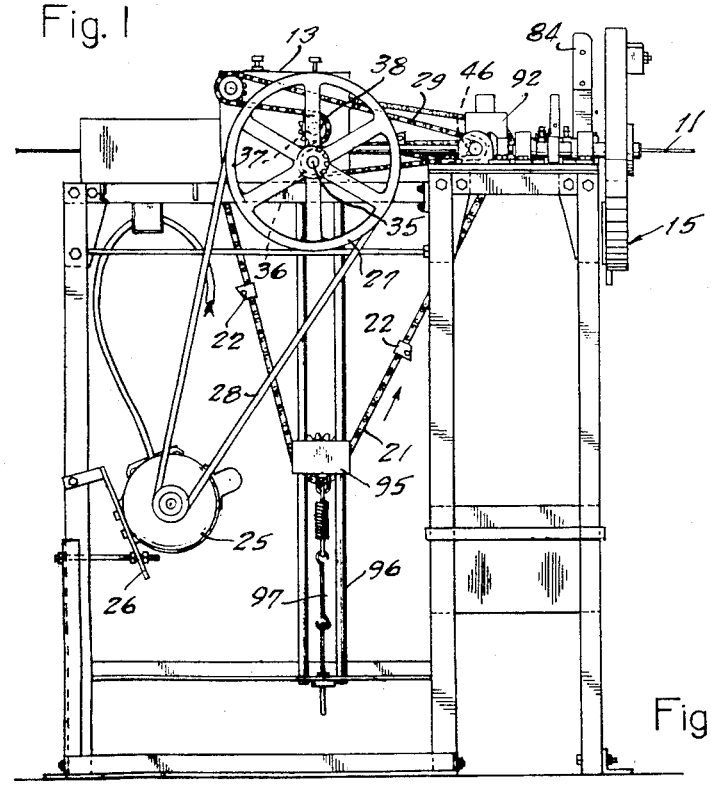
Fig 3
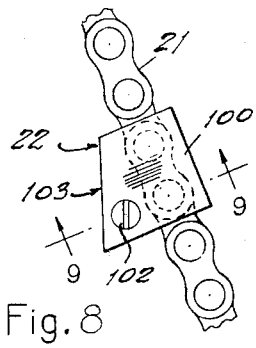
Fig. 8
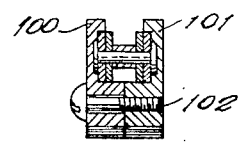
Fig. 9

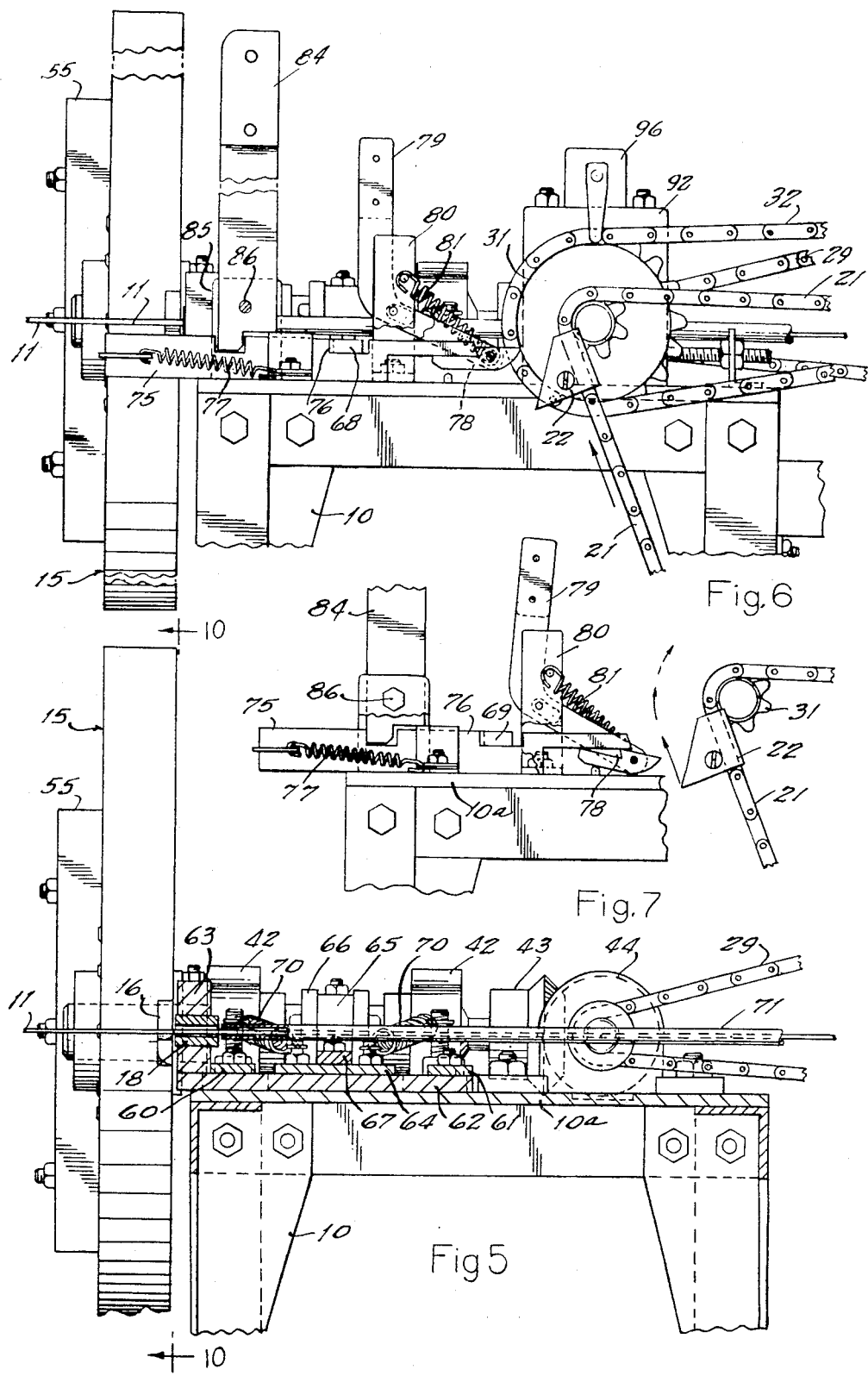

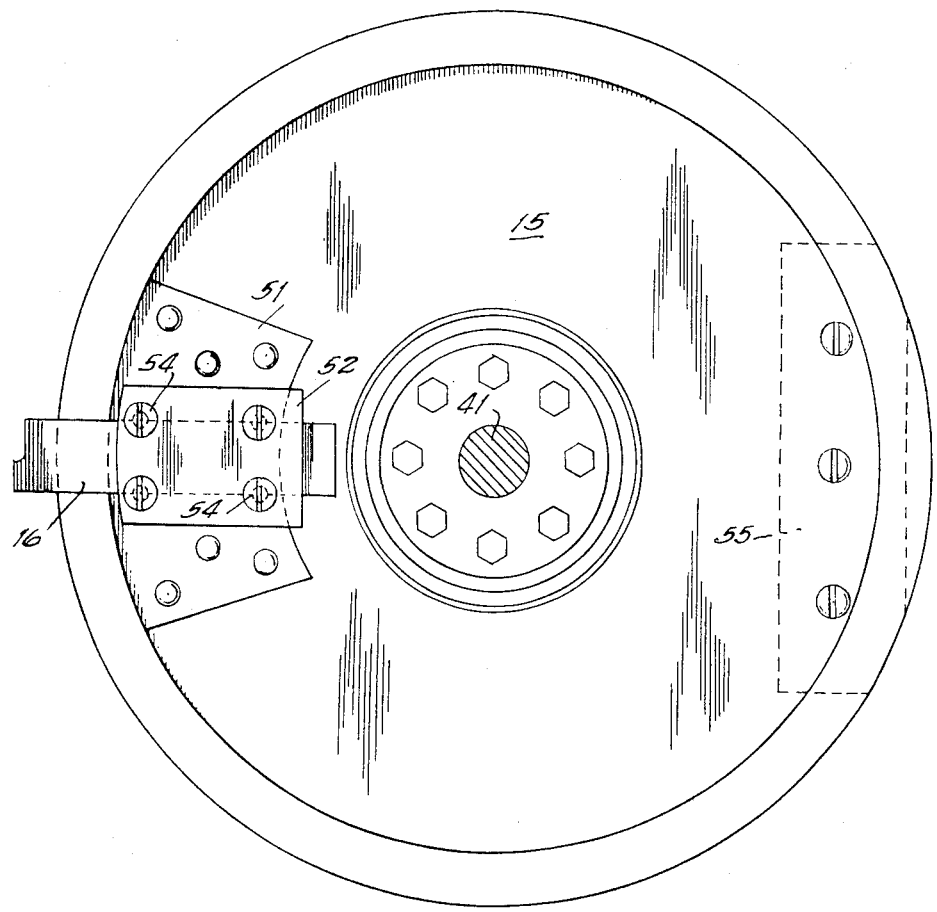
Fig. 10
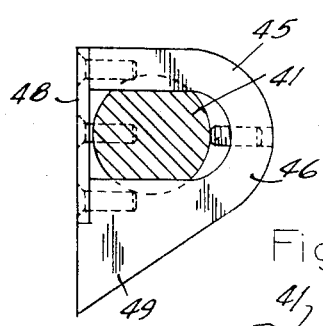
Fig. 12
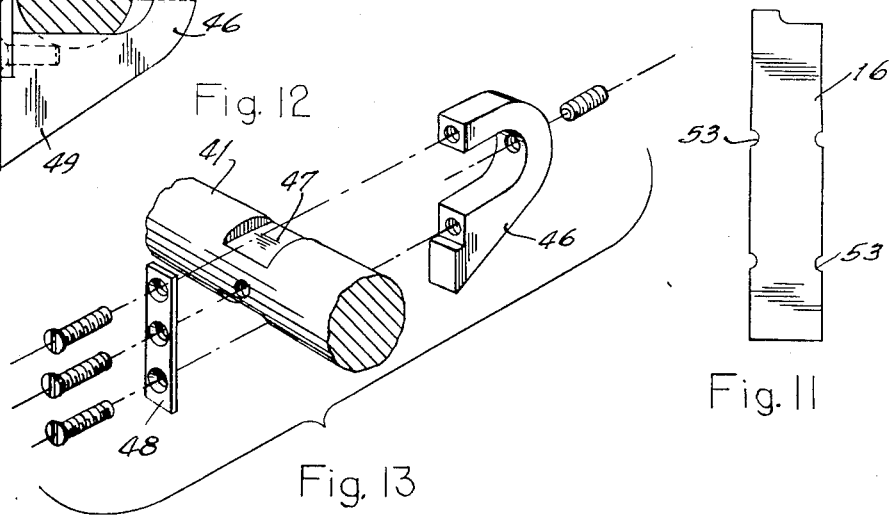
Fig. 11
Fig. 13

WIRE MEASURING AND CUTTING APPARATUS

BACKGROUND AND SUMMARY OF THE INVENTION

This invention relates to apparatus for cutting a continuous strand of wire into segments, and more particularly for automatically feeding, straightening, measuring and cutting segments of preselected length.

This invention is particularly useful in the processing of relatively heavy gauge galvanized wire which is used in the building trades industry, for example, where wire segments of preselected length are used as hangars for supporting the frames for suspended or false ceilings in structures such as office buildings. Wire for such use is conventionally comparatively heavy gauge and therefore quite stiff, and it is supplied to builders in the form of coils which may be several hundred feed in length. The coils are supplied to the job site; and it is then necessary for the work force to straighten the wire from the coil and cut it into preselected lengths for the intended use. Obviously, the processing of the wire in this manner is time consuming and expensive.

It is extremely desirable that a builder have a source where he can obtain the desired wire segments already cut to the desired length and packaged in bundles of convenient number; and it is further desirable, since the requirements in regard to length of segments may vary, that the builder may order such wire segments cut to preselected length and be able to obtain such wire segments on relatively short notice. Correspondingly, it is desirable that a wire processor have the equipment where he can supply the needs of the builder on such relatively short notice.

An object of this invention is to provide apparatus of relatively simple yet rugged construction for cutting a continuous strand of wire into segments of preselected length.

Another object of this invention is to provide such apparatus which is automatic in operation, and which includes a readily changeable program means for preselecting the length of the segments into which the wire is cut.

A further object of this invention is to provide such apparatus which may be conditioned for manual operation, whereby the operator may selectively actuate the apparatus for cutting the wire into segments the length of which are visually observed by the operator.

For accomplishing these objects the apparatus includes a frame having powered roller feed means mounted adjacent one end for advancing a strand of wire along a generally linear path. A powered wire cutting mechanism is disposed adjacent to the other end of the frame; and control means including a trip mechanism is provided for actuating the powered wire cutting mechanism in response to a small physical movement. An endless program chain, carrying trip lugs at preselected spaced intervals, is supported on the frame for carrying the trip lugs in a path to actuate the trip mechanism. The drive means for driving the program chain is synchronized in relation to the powered roller feed means so that the feed means effects the feeding of a predetermined length of the wire strand prior to each operation of the cutting mechanism.

The novel features and the advantages of the invention, as well as additional objects thereof, will be understood more fully from the following description when read in connection with the accompanying drawings.

DRAWINGS

FIG. 1 is an elevation view from the discharge or cutter end of the machine;

FIG. 2 is an elevation view of the left side of the machine, with the cutter wheel at the left;

FIG. 3 is an elevation view of the right side of the machine with the cutter wheel at the right;

FIG. 5 is a fragmentary sectional view taken in the plane 5—5 of FIG. 4 showing details of the wire carriage mechanism;

FIG. 6 is a fragmentary side view from the left side of the machine showing details of the trip mechanism;

FIG. 7 is a fragmentary detail view from the left side showing the trip mechanism set in operative position for manual trip operation;

FIG. 8 is a fragmentary detail view of the trip lug secured to a program chain;

FIG. 9 is a sectional view taken in the plane 9—9 of FIG. 8 showing details of the trip lug;

FIG. 10 is an elevation view of the cutter wheel, as viewed in the plane 10—10 of FIG. 5 from the feed end of the machine;

FIG. 11 is a detail view of the cutter blade;

FIG. 12 is a detail view taken in the plane 12—12 of FIG. 4, showing the carriage slide cam assembly mounted on the cutter wheel shaft; and FIG. 13 is an exploded view of the cam assembly of FIG. 12, and the manner of mounting this assembly onto the cutter wheel shaft.

DESCRIPTION OF THE PREFERRED EMBODIMENT

Figure 4:
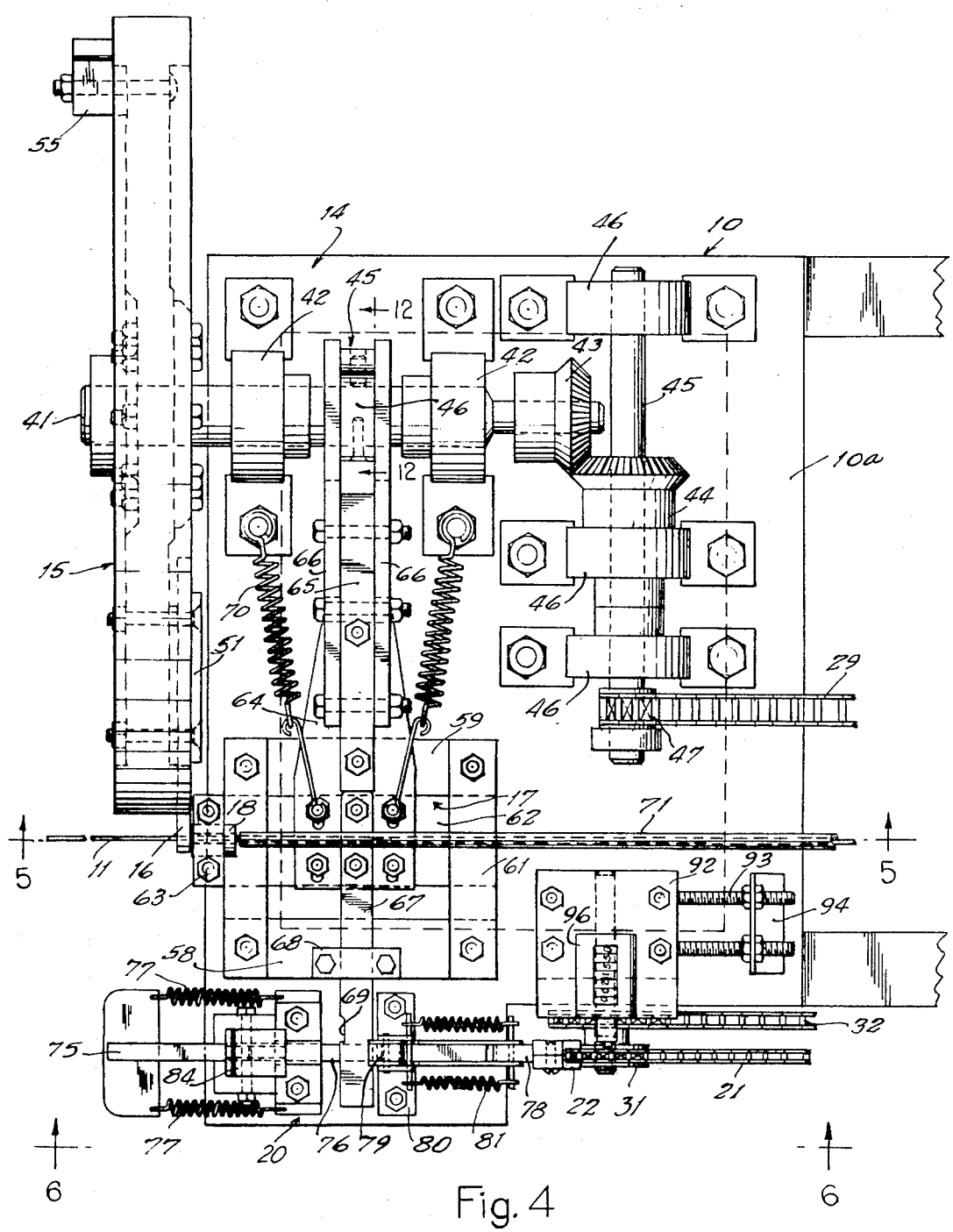
FIG. 4 is a fragmentary plan view showing details of the cutter wheel drive, wire carriage, and trip mechanism as viewed from the left side of the machine.

The drawings illustrate a preferred form of apparatus according to the invention; and the principal components of the apparatus will now be set forth with particular reference to FIGS. 1 through 4.

The apparatus is supported on a frame 10 which defines a table fabricated for example from structural angle members and plates and supporting the operating components at a convenient height for control and service by an operator.

The "feed" of the apparatus is illustrated at the right in FIG. 2, and is so designated since a wire strand 11 is preferably withdrawn from a spool of wire rotatably supported adjacent to this end of the apparatus. The "discharge end" of the apparatus, supports the cutter rotor or wheel to be described and is at the left in FIG. 2. A suitable receiving table may be positioned adjacent to the discharge end for receiving the cut wire segments for suitable bundling or other processing.

A wire straightening and feed mechanism indicated by the housing 13 is fully disclosed in the applicant's U.S. Pat. No. 3,428,097 issued February 18, 1969 entitled WIRE STRAIGHTENING AND CUTTING MECHANISM. The mechanism 12 incorporates straightening rollers mounted on vertical axes for removing lateral bends from the wire strand 11, includes straightening rollers mounted on horizontal axes for removing vertical bends in the wire strand, and also includes feed rollers for withdrawing the wire from a wire supply spool and for feeding the wire strand through the cutter mechanism.

The cutter mechanism 14 mounted on the apparatus 10 adjacent to the discharge end includes a cutter rotor or wheel 15 carrying a cutter blade 16 at its outer periphery. A wire carriage 17, also mounted at the discharge end of the apparatus as best seen in FIG. 4, is reciprocable transversely of the frame and carries a hardened insert bushing 18 defining a cutter edge coacting with the cutter blade of the cutter wheel.

A control mechanism 20 for the wire carriage is also mounted at the discharge end of the apparatus includes means for latching and releasing the wire carriage to effect the coacting engagement of the cutter blade 16 and shear edge 18, and is controlled by a program chain 21 carrying selectively spaced program lugs 22.

The apparatus is powered by a suitable electric motor 25 carried on an adjustable brackets 26, the motor driving a large pulley 27 by means of a suitable belt 28, the pulley being nonrotatably mounted on the shaft of the lower feed roller in the feed mechanism 13. The cutter wheel 15 and its associated drive mechanism is powered by a cutter drive chain 29 which also engages sprockets nonrotatably carried on the shafts of the lower and upper feed rollers to positively couple and drive these feed rollers. A dual sprocket 31 is driven by a drive chain 32 from the shaft of the upper feed roller; and the program chain 21 is driven by the sprocket 32.

Referring now to the feed rollers, which are not shown in detail in these drawings, the lower feed roller is nonrotatably carried on a shaft 35 which also nonrotatably carries the large pulley wheel 27 and a sprocket 36 for the cutter drive chain 29, as best seen in FIG. 3. The upper feed roller is nonrotatably carried on a shaft 37, which also nonrotatably carries a sprocket 38 for the cutter feed chain 29 and a sprocket 39 seen at the left side of the feed mechanism for driving the drive chain 32. The upper feed roller and its associated shaft 37 may be mounted to float vertically within the housing of the unit 13 so that the upper feed may be urged by means of spring force into engagement with the lower feed roller to assure precise and accurate feeding of the wire strand 11. One of the feed rollers may include a peripheral groove for confining the wire strand laterally. Referring now to the cutter mechanism 14, the cutter wheel 15 is a relatively massive flywheel nonrotatably supported on a cutter shaft 41, with the cutter shaft 41 being rotatably supported in bearing blocks 42 mounted on a plate 10a which defines a table portion of the frame 10 at the discharge end. A bevel gear 43, nonrotatably mounted at the feed end of the cutter shaft 41 meshes with a bevel gear 44 nonrotatably carried on a drive shaft 45 supported in suitable bearing blocks 46 mounted on the frame 10a. A sprocket 47 nonrotatably mounted on the drive shaft 45 carries the cutter drive chain 29, providing the drive of the cutter wheel 15 from the lower feed roller shaft 35. There is a direct relationship, then, between the lower feed roller rpm and the cutter wheel rpm and therefore between the rate of feed of the wire strand 11 relative to the cutter wheel rpm.

Also nonrotatably mounted on the cutter wheel shaft 41 is a cam 45 for partially controlling in part the reciprocation of the wire carriage 17; this cam 45 being shown in detail in FIGS. 12 and 13. It will be seen that the cam assembly includes a U-shaped cam member 46 defining a yoke for closely engaging a flatted portion 47 of the cutter wheel shaft 41, and a retainer plate 48 retains the cam member on the shaft by means of suitable screws. Since the cam and cutter wheel are both nonrotatably mounted on the cutter shaft 41, there will of course be one revolution of the cam for each revolution of the cutter wheel. The cam member 46 defines a single actuator lobe 49 for the cam 45.

The cutter wheel 15 and shear blade 16 are shown in detail in FIGS. 10 and 11. As mentioned above the cutter wheel is a relatively massive wheel to produce a flywheel effect. The shear blade 16 is an elongated blade, of hardened steel for example, rigidly supported on the wheel between guide plates 51 defining parallel and generally radial guide edges, and a retainer plate 52 overlying the guide plates 51. The edges of the shear blade are provided with notches 53 positioned to partially receive the shanks of machine screws 54 by means of which the retainer plate 52 is secured to the fly wheel. This assures that the shear blade will not move radially during operation. A counterweight 55 is secured to the cutter wheel at the edge remote from the shear blade mounting assembly to balance the fly wheel.

The reciprocating wire carriage 17 is guided on the frame plate 10a by left and right stops 58 and 59 respectively which overlie the frame plate and by guide plates 60 and 61 which overlie the stops 58 and 59 and are respectively adjacent the discharge and feed ends of the apparatus. A slide plate 62 is confined between the above mentioned stop plates and guide plates and the frame plate 10a, and carries at its end adjacent to the cutter wheel 15 a support clamp 63 for the hardened insert bushing or sleeve 18.

A follower plate 64 is adjustably secured to the slide plate 62 by means of suitable screws or bolts, with the bolt holes for the follower plate being elongated to allow for relative adjustment between the follower plate and slide plate in the direction of reciprocation of the wire carriage. The follower plate carries an elongated follower bar 65 rigidly secured thereto; and lateral guide plates 66 are rigidly secured to the follower bar, these guide plates defining a yoke at the right hand end which receives the cutter wheel shaft 41, with the yoke portion of the guide plates enclosing the cam 45. The guide plates 66 then function to maintain appropriate alignment of the follower bar 65 and the rotating cam member 46 to guide the reciprocation of the wire carriage.

An additional element of the wire carriage is the latch finger 67 which is secured to the follower plate 64 and extends to the left in alignment with the follower bar 65. This latch finger 67 is guided against lateral movement by a guide strap 68, secured to the stop plate 58, and the latch finger is provided with a notch 69 at its left end facing the discharge end of the apparatus.

The reciprocating wire carriage 17 then includes the following elements: the slide plate 62 carrying the support clamp 63 and bushing 18, the follower plate 64, follower bar 65 and guide plates 66, and the latch finger 67. Lateral movement of this assembly is prevented, at the right hand end, by the guide plate 66 coacting with the cam assembly 45 and, at the left hand end, by the latch finger 67 confined in the guide strap 68. This wire carriage is urged to the right at all times by tension springs 70 which are connected between the carriage and the bearing blocks 42 for the cutter shaft 41. FIG. 4 shows the right hand limiting position where the wire strand 11 is carried by the bushing 18 into the path of the cutter blade 16 to effect the cutting of the wire. This is the "cut position" of the carriage.

The wire strand 11 which emerges from the straightening and feeding unit 12 is quite straight with kinks removed, and desirably follows a path aligned with the path through the straightening and feeding units. The wire bushing 18, then, is aligned in this path provided of course that it will be reciprocated slightly by the wire carriage 17. To protect and guide the wire strand 11 as it passes from the feed unit 12 to the sleeve 18, the wire is enclosed in an elongated sleeve 71 pivotally secured adjacent to the feed unit 12 and overlying the above described elements of the wire carriage.

The control mechanism 20 for the apparatus includes an elongated trip bar 75 mounted for reciprocating movement at the left side of the frame plate 10a in a direction transverse to the movement of the wire carriage 17. As best seen in FIG. 6, this trip bar includes a notch defining a detent 76 positioned to engage the notch 69 of the wire carriage latch finger 67 to lock the wire carriage in its left hand or "pass position" wherein the bushing 18 maintains the wire 11 out of the path of the cutter blade. The trip bar 75 is continuously urged in a direction toward the feed end of the apparatus by means of tension springs 77 to continuously maintain the detent 36 in engagement with the latch finger 67. At any time, then, that the wire carriage is moved to the left to position the notch 69 in alignment with the detent 76, this latch mechanism will engage to maintain the wire carriage in such position until it is released. In FIG. 4 the wire carriage is shown in the "cut position" wherein the movement of the carriage to the right is limited by engagement of the slide plate 62 with the stop plate 59; and in this position the follower bar 65 is in position to be engaged and actuated by the lobe 49 of the cam 45 to shift the carriage to the "pass position."

A trip link 78 is associated with the trip bar and is mounted to be selectively positioned, either to define an extension of the trip bar extending toward the feed end of the apparatus, or to be displaced to effect a shortening of the trip bar. This trip link 78 is pivotally supported on a trip link lever 79, with the trip link lever being pivotally supported on the frame plate 10a by means of suitable brackets 80. The pivotal mounting of the lever 79 permits limited sliding as well as pivotal movement of the lever 79. Springs 81 are provided for coupling the trip link to the brackets to continually urge the trip link pivot upwardly and toward the discharge end of the apparatus to maintain the trip link in preselected positions to be described.

In FIG. 6 the trip link 78 is positioned to define an extension of the trip bar and is maintained in this position by means of the springs 81. Also as seen in FIG. 6, with the trip link in this position, it extends into the path of the program chain lugs 22 so that as each lug passes the trip link it acts as a cam engaging the trip link and effecting a shifting of the trip link and trip bar toward the discharge end of the apparatus to release the latch provided by the detent 76 and notch 69.

In FIG. 7, the trip link lever 79 has been shifted to position the trip link 78 below the trip bar 75 to effectively shorten the trip bar; and the trip link is maintained in this position by the springs 81. In this position the program chain lugs 22 do not engage the trip link to effect release of the control mechanism latch.

To provide for manual release of the latch mechanism, a manually operable trip lever 84 is pivotally mounted on the apparatus by means of suitable brackets 85 by the pivot pin 86; and this lever 84 includes a downwardly projecting finger 87 engaging a suitable notch in the trip bar 75. It will be seen that pivotal movement of the lever 84 clockwise as viewed in FIGS. 6 and 7 effects a shifting of the trip bar 75 to the left to release the wire carriage latch. This provides for manual operation of the cutting apparatus as will be described.

Referring now to the program chain 21 as particularly illustrated in FIGS. 2, 4 and 6, this chain is supported in a triangular array over the dual idler sprocket 31, an idler sprocket 90 mounted on the housing of the unit 13, and a lower idler sprocket 91 which is adjustable as will be described. As best seen in FIGS. 4 and 6, the dual idler sprocket 31 is rotatably supported in a bearing block 92 mounted on the frame plate 10a; and the position of this bearing block 92 may be adjusted and secured by means of adjusting screws 93 and a coating bracket 94. This adjustment controls the positioning of the chain lugs 22 relative to the trip bar 75 and link 79. The larger sprocket of the dual sprocket carries the drive chain 32 which is driven by the sprocket 39 carried on the shaft 37 of the upper feed roller. Idler sprocket 40 may be adjustable to control the tension of the drive chain 32.

The adjustable idler sprocket 91 is carried on a bearing block 95 which is slidaby supported on vertical guide rods 96 attached to the frame 10 as best seen in FIG. 2 An adjustable tension spring and link assembly 97 coacting with the frame 10 urges the bearing block 95 downwardly to maintain desired tension on the program chain 21. This adjustable idler sprocket 91 is provided so that the apparatus may accommodate different lengths of program chains 27 as will be described. With this arrangement, the program chain is readily changed to set up the apparatus for the cutting of a wide variety of selected lengths of wire strands 11.

The lugs 22 of the program chain 21 are shown in detail in FIGS. 8 and 9. As seen in these figures the lug 22 consists of mating elements 100 and 101 defining a recess for accommodating one link of the program roller chain as best seen in FIG. 8. As best seen in FIG. 9, the element 101 is provided with a threaded bore and the element 100 is provided with a mating larger bore to accommodate the shank of a headed screw 102 which passes through this bore and is threaded into the bore of the element 101. In this manner the lug elements are clamped together to immovably secure the lug assembly onto the chain 21, and the assembly defines a cam surface 103 which is inclined relative to the direction of movement of the chain, which cam surface engages the trip link 79 as above described. The direction of movement of the program chain 21 is indicated by the arrows in FIGS. 2, 6 and 7.

Desirably the apparatus includes a counter 106 which may be conveniently mounted on the bearing block 92 having a finger 107 positioned in the path of the program chain lugs 22 so that the counter is actuated by each lug immediately following actuation of the trip bar of the control mechanism.

OPERATION

The operation of the apparatus will now be described briefly in order to illustrate the adaptability of the apparatus to cutting wire strands in a wide variety of useful lengths.

First let it be assumed that the drive ratio between the wire feed rollers and the cutter wheel 15 is one to one. Let it be further assumed that the circumference of the feed rollers is 6 inches; and with these assumptions, a wire strand will be fed through the apparatus at the rate of 6 inches for each revolution of the cutter wheel. Accordingly if the wire carriage is moved to the "cut position" for each revolution of the cutter wheel 15, the wire strand 11 will be cut into 6 inch segments.

The program chain 21 may be provided in a variety of lengths, and with the lugs spaced at different selected intervals, so that the apparatus may be set up to automatically cut the wire strand to any desired length which is a multiple of six inches.

By way of example, the larger sprocket of the dual sprocket 31 may have twice the number of the teeth of the drive sprocket 39 for the dirve chain 32, so that the dual sprocket is rotated at half the speed of the feed rollers. The smaller sprocket of the dual sprocket 31 is also of course rotated at one half the speed; and if it is assumed that this smaller sprocket has an equivalent circumference of three inches, this means that for each advance of the program chain 3 inches past a given point the wire strand 11 will have been advanced 12 inches through the apparatus, the ratio being one to four. Accordingly if the program chain 21 is a 4 foot chain having four lugs spaced apart at 1 foot intervals, the apparatus in automatic operation will cut 4 foot segments of wire. If the same four foot chain is provided with only two lugs at 2 foot intervals, applying the one to four ratio, the apparatus will cut wire lengths of 8 feet; or if only one lug is placed on the chain the length of wire cut will be 16 feet.

As has been described, various lengths of program chains 21 may be readily placed on the machine through the adjustable sprocket 91, and the lugs 22 may be mounted on the chain at desired intervals with the above ratios in mind so that the apparatus may be quickly programmed to automatically cut wire segments of almost any selected length. As a practical matter, a number of program chains with appropriately spaced lugs for wire lengths in most demand, may be kept available so that the machine may be converted with a few minutes from one segment length to another.

As has been described, the normal position of the wire carriage 17 is the "pass position" wherein the carriage is held in the left hand position by the latch mechanism. In this position the insert bushing 18 and the wire strand 11 are positioned outside the path of the cutter blade 16 so that the wire is not cut.

When the latch mechanism is released through engagement of the trip link 69 by a program lug 22, the wire carriage is immediately urged by the springs 70 to shift the wire carriage to the "cut position" wherein the insert bushing 18 places the strand 11 in the path of the cutter blade 16. The timing of the apparatus at the time of this release of the wire carriage is such that the cutter blade 16 is, for example, slightly more than 60° ahead of its carriage shift position. This assures that at the time of release of the wire carriage, the wire carriage will move to the "cut position", and that the cutter wheel blade 16 will pass the wire guide bushing 18 to shear the wire immediately prior to return of the wire carriage to the "pass position" by engagement of the cam lobe 49 with the carriage follower bar 65. As the wire carriage is returned by the cam 45 to the pass position, it is latched in this position by the latch bar, to be released again when the next lug 22 engages the trip link 69.

The cutter apparatus may be operated manually when it is desired to cut lengths of wire for which there is no readily availabe program chain, or for operating the apparatus during set up, testing, or maintenance. For this purpose the trip link 69 may be shifted to the inoperative position shown in FIG. 7 by moving the lever 79 clockwise, and allowing the springs 81 to retain the link in this position wherein any lugs of the program chain will pass by the trip link.

The manual lever 84 then may be used to release the latch mechanism by clockwise rotation, as viewed in FIG. 6; and after the wire has been sheared the wire carriage will be returned to the pass position as above described. For manual operation, the operator would observe the feed of the wire to a desired point on the receiving table and manually actuate the cutter mechanism through the manual trip lug 84 when the desired length has been visually observed.

What has been described is a useful and practical form of wire cutting apparatus which is relatively simple in configuration and construction and which is readily adapted with very little set up time to automatically cut a continuous strand of wire into segments of any desired length.

While the preferred embodiment of the invention has been illustrated and described, it will be understood by those skilled in the art that changes and modifications may be resorted to without departing from the spirit and scope of the invention.

What is claimed is:

1. Apparatus for feeding and cutting a continuous strand of wire into segments of preselected length comprising
   a frame;
   roller feed means mounted on said frame for advancing a strand of wire along a generally linear path; power drive means for said roller feed means;
   a powered wire cutting mechanism including a wire guiding element and a coacting cutting element, said wire guiding element defining the wire path at the cutting mechanism; one of said elements being mounted for movement into and out of a cutting position relative to the other; control means including a trip mechanism for selectively moving said one element into said cutting position;
   an endless program chain carrying trip lugs at preselected spaced intervals; means supporting said program chain for carrying said trip lugs in a path to actuate said trip mechanism;
   and drive means for driving said program chain in synchronized relation to said powered roller feed means for effecting the cutting of the wire into preselected lengths as measured and fed by said roller feed means.

2. Apparatus as set forth in claim 1
   said wire cutting mechanism comprising a cutter rotor carrying a cutter blade at its periphery, defining the cutter element thereof, and a wire carriage carrying a wire guide bushing having a cutter edge coacting with said cutter blade, defining the guiding element thereof; said cutter rotor being rotatable about an axis generally parallel to the wire path;

means supporting said wire carriage for reciprocating movement on said frame in a direction perpendicular to the axis of rotation of said cutter rotor for movement of said guide bushing into and out of said cutting position in the path of said cutter blade;

and said trip mechanism controlling the moving of said guide bushing into said cutting position in the path of said cutter blade.

3. Apparatus as set forth in claim 2 said cutter rotor being nonrotatably fixed on a drive shaft; a rotary cam nonrotatably fixed on said rotor shaft;

said wire carriage having a cam follower member disposed for engagement with said rotary cam; spring means urging said wire carriage to said cutting position wherein said guide bushing is positioned in the path of said cutter blade and wherein said cam follower member is positioned for engagement by said cam; said cam moving said wire carriage from said cutting position to the pass position wherein said guide bushing is out of the path of the cutter blade;

and said trip mechanism including spring loaded detent means for latching said wire carriage in the pass position.

4. Apparatus as set forth in claim 3 said trip mechanism including a trip bar mounted on said frame for reciprocating movement; said trip bar defining said spring loaded detent means for the latching of said wire carriage;

and said trip bar being disposed for engagement and movement by said program chain lugs to effect the release of said wire carriage when engaged by each said lug.

5. Apparatus as set forth in claim 4 a trip link defining an extension of said trip bar; and means supporting said trip link relative to said frame for alternatively, on the one hand, positioning said link as an extension of said trip bar wherein said trip link is engaged by said program chain lug to effect the shifting of said trip bar and, on the other hand, displacing said link from said lug engaging position.

6. Apparatus as set forth in claim 1 means for effecting uniform periodic operation of said cutting element, independent of the selected position of said one element.

7. Apparatus as set forth in claim 2 said cutter rotor defining a flywheel.

8. Apparatus as set forth in claim 2 means for driving said cutter rotor in synchronized relation with said roller feed means.

9. Apparatus as set forth in claim 2 power means for moving said guide bushing carriage into the cutting position, said power means being actuated by said trip mechanism;

power means for moving said guide bushing carriage out of the cutting position, said last named power means being synchronized with said cutter rotor.

10. Apparatus as set forth in claim 3 lever means operatively coupled to said spring loaded detent means, for manually moving said detent means to release said wire carriage.

* * * * *